United States Patent [19]
Shekhawat

[11] Patent Number: 5,120,986
[45] Date of Patent: Jun. 9, 1992

[54] SINE WAVE SYNTHESIS CONTROLLER CIRCUIT FOR USE WITH A NEUTRAL-POINT CLAMPED INVERTER

[75] Inventor: Sampat Shekhawat, Red Bank, N.J.

[73] Assignee: Allied-Signal Inc., Morris Township, Morris County, N.J.

[21] Appl. No.: 756,015

[22] Filed: Sep. 6, 1991

[51] Int. Cl.[5] .................... H03K 5/00; H02M 5/42
[52] U.S. Cl. .................... 307/261; 307/265; 328/28; 328/29; 328/58; 363/98
[58] Field of Search .............. 307/261, 265–268, 307/643, 648; 328/14, 28, 29, 58; 363/98

[56] References Cited

U.S. PATENT DOCUMENTS

| | | | |
|---|---|---|---|
| 3,795,868 | 3/1974 | Ohme et al. | 307/261 |
| 3,821,652 | 6/1974 | Wiebe et al. | 307/261 |
| 4,016,496 | 4/1977 | Eastcott | 307/261 |
| 4,204,266 | 5/1980 | Kammiller et al. | 363/98 |
| 4,743,856 | 5/1988 | Keating | 307/265 |
| 4,748,345 | 5/1988 | Landgraf | 307/268 |
| 4,799,139 | 1/1989 | Kähkipuro et al. | 363/98 |
| 4,872,100 | 10/1989 | Diaz | 363/98 |
| 4,885,674 | 12/1989 | Varga et al. | 363/21 |
| 4,941,076 | 7/1990 | Diaz | 363/98 |
| 5,045,800 | 9/1991 | Kung | 307/261 |

*Primary Examiner*—Stanley D. Miller
*Assistant Examiner*—Terry D. Cunningham
*Attorney, Agent, or Firm*—Robert P. Marley; Howard G. Massung; Robert A. Walsh

[57] ABSTRACT

A sine wave synthesis controller circuit intended to be utilized in conjunction with a digitally-controlled neutral-point clamped inverter to produce a sinusoidal waveform from a direct current source. The controller circuit is configured so that it provides separate positive and negative control signals to the neutral-point clamped inverter's logic controller. These signals direct the modulation a sinusoidal waveform in response to a reference sine wave, the instantaneous voltage output by the neutral-point clamped inverter, as well as positive and negative reference voltages input to the controller.

5 Claims, 5 Drawing Sheets

SINE WAVE SYNTHESIS CONTROLLER CIRCUIT FOR USE WITH A NEUTRAL-POINT CLAMPED INVERTER

BACKGROUND OF THE INVENTION

The present invention provides a sine wave synthesis controller circuit intended to be utilized in conjunction with a digitally-controlled neutral-point clamped inverter to produce a sinusoidal waveform from a direct voltage source.

Power inverters, and in particular, neutral-point clamped inverters, are utilized to produce alternating current waveforms from direct current sources. Such inverters are typically controlled via digital logic signals and the waveform production is usually performed in response to a reference alternating current waveform and/or various other control signals. One problem associated with such waveform production is insuring the proper tracking of the reference waveform by the inverter output.

Accordingly, it is the object of the present invention to provide a simple and reliable sine wave synthesis controller circuit for use with a digitally-controlled neutral-point clamped inverter which insures accurate tracking of a reference waveform by the inverter, and which provides for an improved output waveform.

SUMMARY OF THE INVENTION

This invention provides a sine wave synthesis controller circuit intended to be utilized in conjunction with a digitally-controlled neutral-point clamped inverter to produce a sinusoidal waveform from a direct voltage source. The circuit is configured so that it provides two separate control signals to the neutral-point clamped inverter's logic controller (one control signal related to the regulation of the positive portion of the synthesized waveform, and one related to the regulation of the negative portion of the synthesized waveform). These signals direct the production of a sinusoidal waveform in response to a reference sine wave, the instantaneous voltage output by the neutral-point clamped inverter, and positive and negative reference voltages. In a preferred embodiment the sine wave synthesis controller circuit is comprised of five individual amplifiers.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

Figure 1:
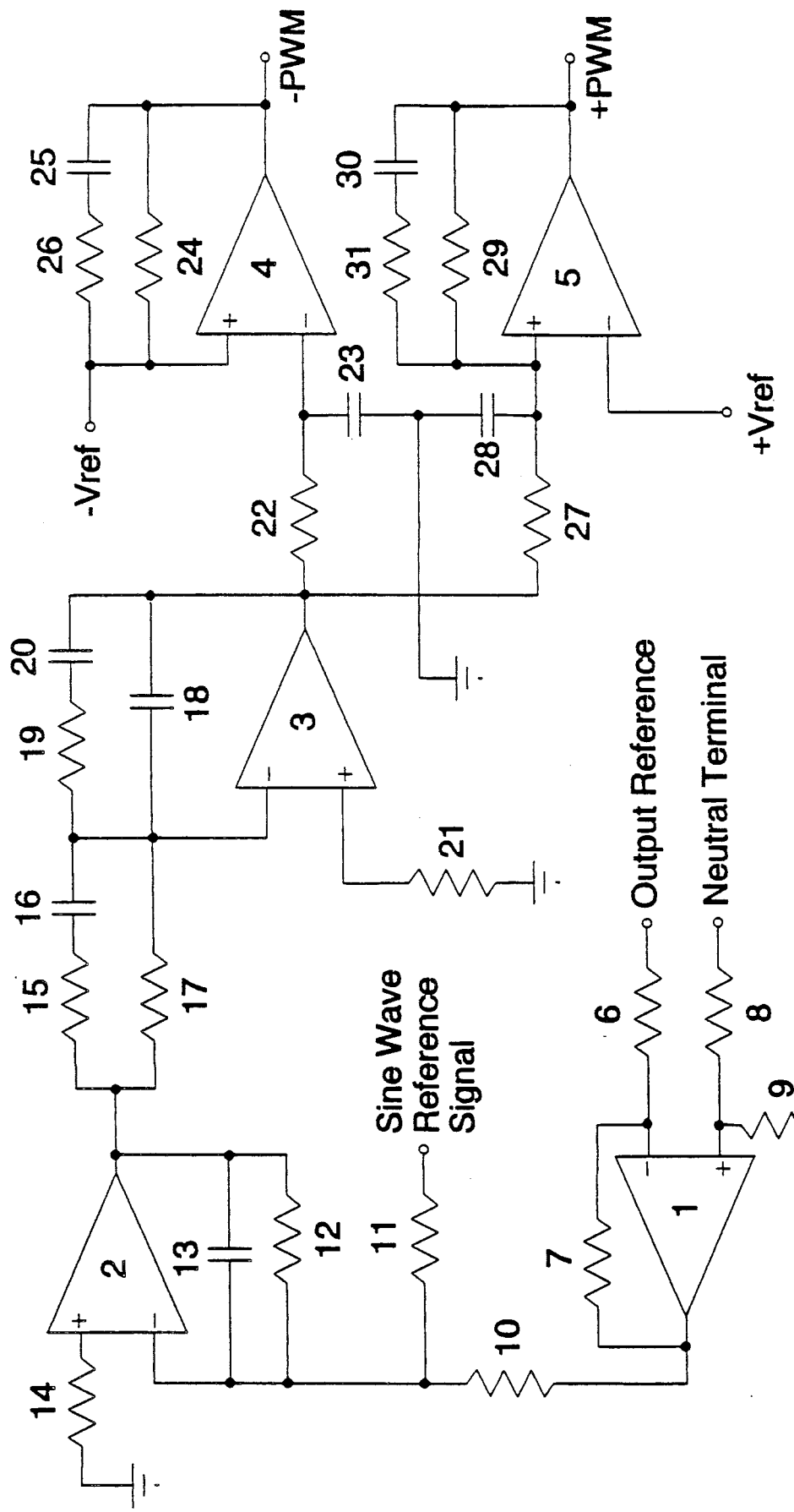
FIG. 1 is a schematic of a preferred embodiment of the invention.

A preferred embodiment of the invention consists of five operational amplifiers configured to output two separate control signals (+PWM and −PWM) in response to a several input reference signals. These control signals are then fed to a logic circuit which directs the production of a sine wave by a digitally-controlled neutral-point clamped inverter. A schematic of one such embodiment of the invention is shown in FIG. 1. The five operational amplifiers are designated as follows: differential amplifier 1, summing amplifier 2, proportional integral differentiator ("PID") controller 3, negative comparator 4, and positive comparator 5.

The negative input terminal of the differential amplifier is coupled to an output reference signal via an input resistor 6. This is typically the output voltage from the neutral-point clamped inverter with which the synthesizer is employed. The negative input terminal of the differential amplifier is also connected to the amplifier's output terminal via a feedback resistor 7. The positive input terminal of the differential amplifier is coupled to a neutral electrical reference point via input resistor 8. The positive input terminal of the differential amplifier is also connected to ground through resistor 9; this ground connection serves to improve the overall noise immunity of the controller.

The output of the differential amplifier is fed to the negative input terminal of the summing amplifier via an input resistor 10. A sine wave reference signal is also coupled to the negative input terminal of the summing amplifier via an input resistor 11. This reference signal, which is generated by an external source, provides the model sinusoidal waveform to which the output of the neutral-point clamped inverter will be modulated to match. The negative input terminal of the summing amplifier is also connected, via a parallel arrangement of a feedback resistor 12 and feedback capacitor 13, to the amplifier's output terminal. The positive input terminal of the summing amplifier is connected to ground via an input resistor 14; this ground connection serves to improve the overall noise immunity of the controller.

The output of the summing amplifier (which is an error signal indicative of the difference between the output level of the neutral-point clamped inverter and the level of the reference sine wave) is fed to the negative input terminal of the PID controller amplifier via a first input resistor 15 in series with an input capacitor 16, as well as a second input resistor 17. This input network serves to differentiate the incoming signal. The negative input terminal of the PID controller amplifier is also connected to the output terminal of that amplifier by a first feedback capacitor 18, as well as a feedback resistor 19 serially connected to a second feedback capacitor 20. This configuration of this feedback network results in the integration of the previously differentiated signal input to the PID controller amplifier. The positive input terminal of the PID controller amplifier is connected to ground via an input resistor 21.

The output of the PID controller amplifier is fed to the negative input terminal of the negative comparator by an input resistor 22. The negative comparator's negative input terminal is also connected to ground via a filter capacitor 23. A negative reference voltage is connected to the positive input terminal of the negative comparator. The level of this reference voltage determines the sensitivity of the comparator. The positive input terminal of the negative comparator is coupled to the output terminal of the negative comparator by a first feedback resistor 24, as well as a feedback capacitor 25 serially connected to a second feedback resistor 26. This feedback network serves to provide required hysteresis.

The output of the PID controller amplifier is also fed to the positive input terminal of the positive comparator by an input resistor 27. The positive comparator's positive input terminal is also connected to ground via a filter capacitor 28. A negative reference voltage is connected to the negative input terminal of the positive comparator. The level of this reference voltage determines sensitivity of the comparator. The positive input terminal of the positive comparator is coupled to the output terminal of the positive comparator by a first feedback resistor 29, as well as a feedback capacitor 30 serially connected to a second feedback resistor 31. This feedback network provides the required hysteresis.

The output signal from the positive comparator (designated +PWM) is input to a logic control circuit which serves as an interface between the above described sine wave synthesis controller circuit and the neutral-point clamped inverter. This +PWM signal is processed by the logic control circuitry so as to cause transistors within the inverter to be switched on and off, modulating the positive portion of the inverter's output so as to minimize the +PWM error signal output by the summing amplifier. Similarly, the output signal from the negative comparator (designated −PWM), is input to the logic control circuitry and serves to regulate the negative portion of the synthesized waveform produced by neutral-point clamped inverter. This separation of the signals which regulate the positive and negative portions of the synthesized waveform insures proper tracking of the sine wave reference signal by the neutral-point clamped inverter.

Figure 2:
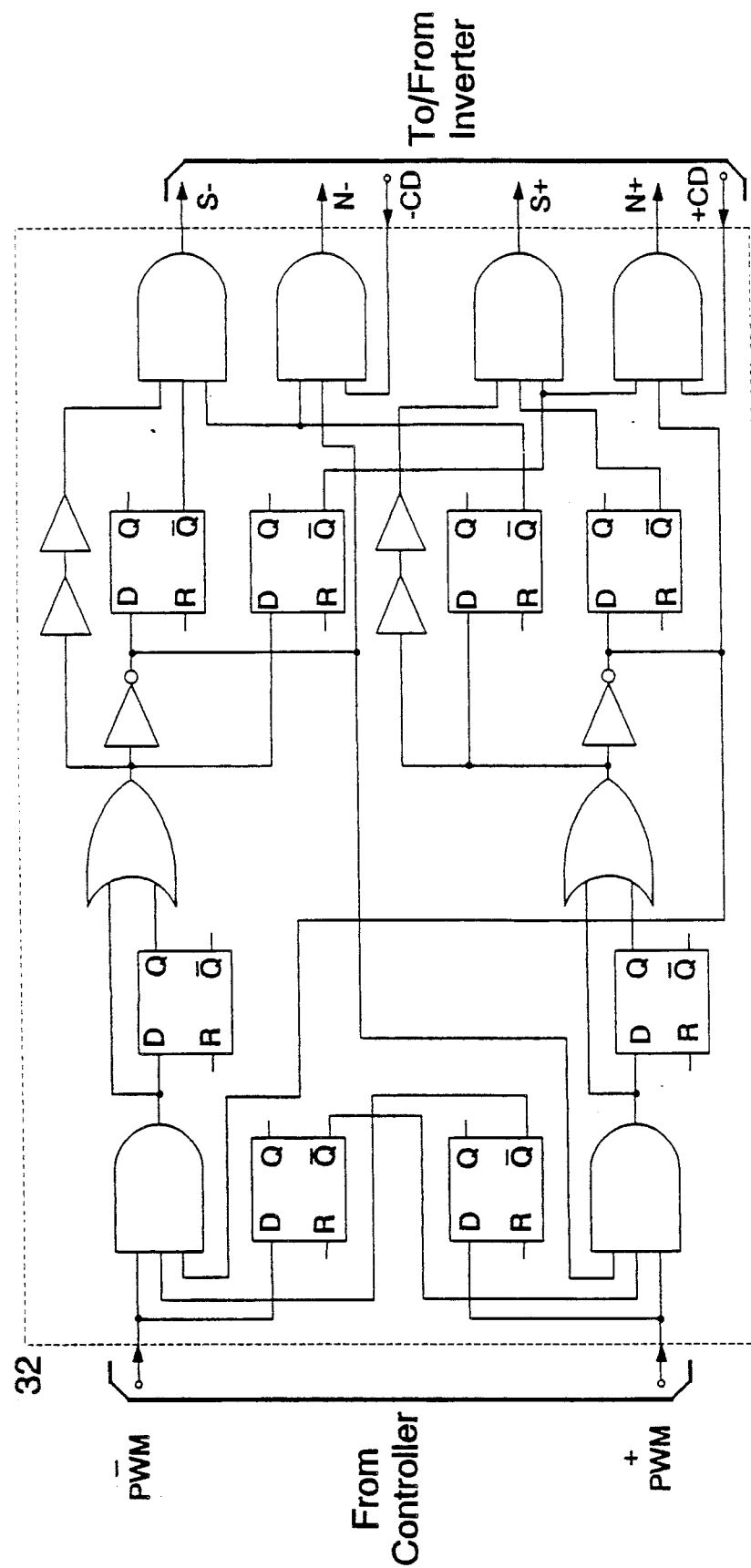
FIG. 2 is a diagram illustrating a typical control logic circuit which may be used to modulate the output of a neutral-point clamped inverter.

In operation, the above described controller circuit operates as follows. The differential amplifier serves to invert and normalize the output reference signal. This inverted normalized signal is then algebraically added to the sine wave reference signal by the summing amplifier. The amplitude of the output signal of the summing amplifier is therefore a function of the difference (or error) between the instantaneous amplitude of the output reference signal and that of the sine wave reference signal. The error signal is then differentiated and then integrated by the PID controller so as to provide feedback compensation for increased waveform stability. The output of the PID controller is then fed to the positive and negative comparators. The output of each of these comparators changes state whenever the input integrated error signal exceeds the level of the reference voltage input to that comparator. Each comparator output is coupled to a logic control circuit, which as a function the state of each comparator's output, controls the modulation of the neutral-point clamped inverter's output, and causes a sine wave to be produced. FIG. 2 shows a typical control logic circuit 32 which may be used in conjunction with the above described synthesizer to modulate the output of a neutral-point clamped inverter. The illustrated logic circuit has as its input positive and negative waveform modulation error signals (+PWM, −PWM), as well as signals indicating the direction of the synthesized waveform current (+CD, −CD). The logic circuit outputs two pairs of control signals (S+, N+) and (S−, N−), which direct, respectively, the synthesis of the positive and negative portions of the waveform produced by the neutral-point clamped inverter.

Figure 3:
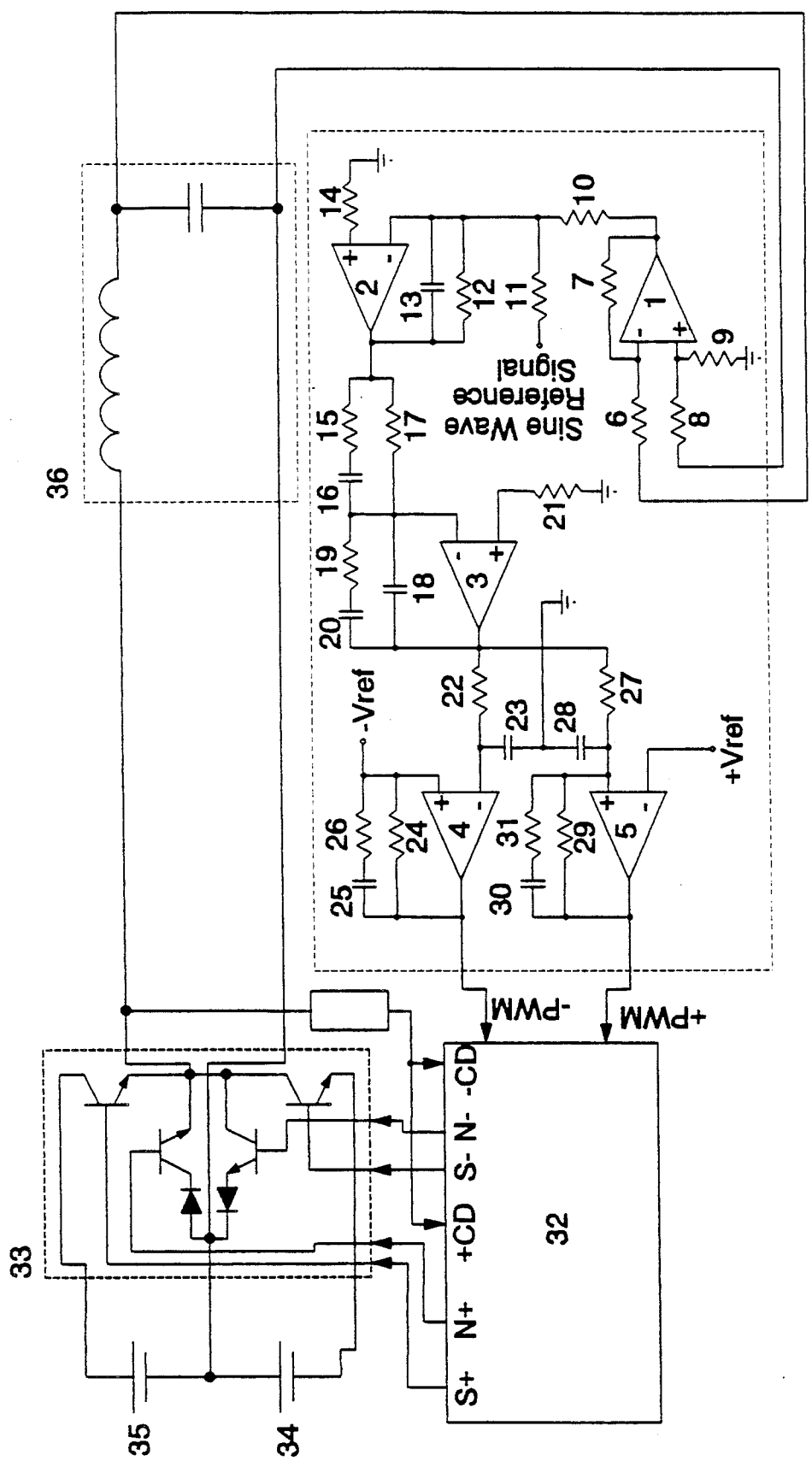
FIG. 3 is a diagram illustrating a digitally-controlled neutral-point clamped inverter employing the control circuit of FIG. 1.

FIG. 3 is a diagram showing the above described embodiment of the invention as it would be employed with a typical digitally-controlled neutral-point clamped inverter. The output from each of the comparators 4, 5 is shown to be coupled, to digital logic circuitry 32, which is itself coupled to a neutral-point clamped inverter 33. The positive output line of the neutral-point clamped inverter is also coupled to the digital logic circuitry so as to allow that circuitry to sense the instantaneous direction of the current output by the inverter (see the lines labeled +CD (+Current Direction) and −CD (−Current Direction)). The neutral-point clamped inverter is supplied by a DC source (depicted as two batteries 34, 35), and has a two terminal output which is fed to an L-C filter 36. The output of the filter is fed to the negative input terminal of the differential amplifier 1.

Figure 4:
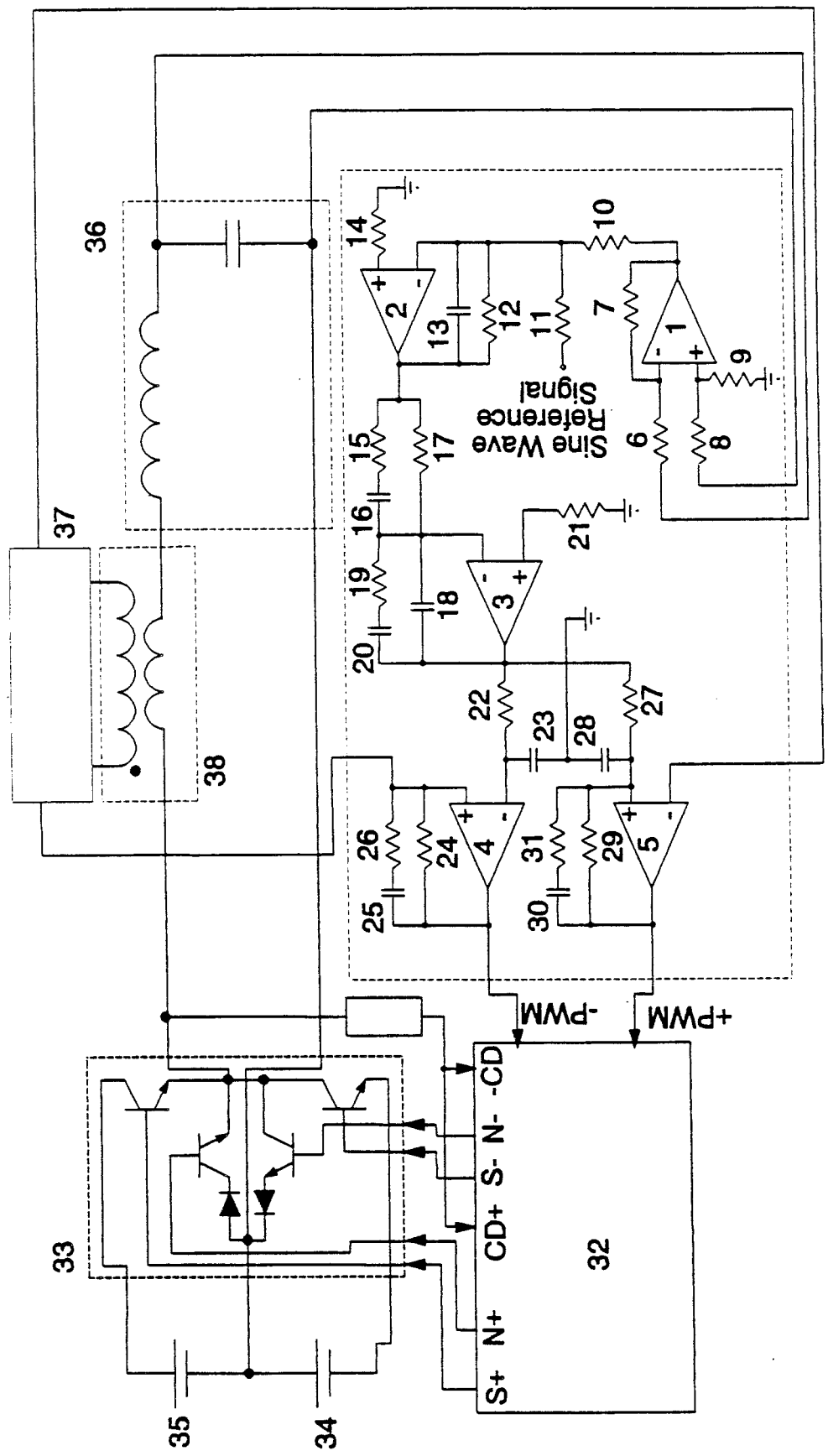
FIG. 4 is a diagram illustrating a digitally-controlled neutral-point clamped inverter employing the control circuit of FIG. 1 and incorporating a current feedback loop.

FIG. 4 also shows the invention as it would be employed with a typical digitally-controlled neutral-point clamped inverter. However, in addition to the circuitry shown in FIG. 3, a reference voltage generator 37 and a current transformer 38 have been incorporated. The primary winding of the current transformer 38 is serially connected between one of the inverter's output lines and the L-C filter. The current transformer's secondary winding is connected to the reference voltage generator. This generator provides reference voltage signals to the positive and negative comparators as a function of the neutral-point clamped inverter's output current level (as sensed through the output of the current transformer's secondary winding). This current-dependant feedback scheme increases system stability and provides for improved harmonic tracking of the sine wave reference signal.

Figure 5B:
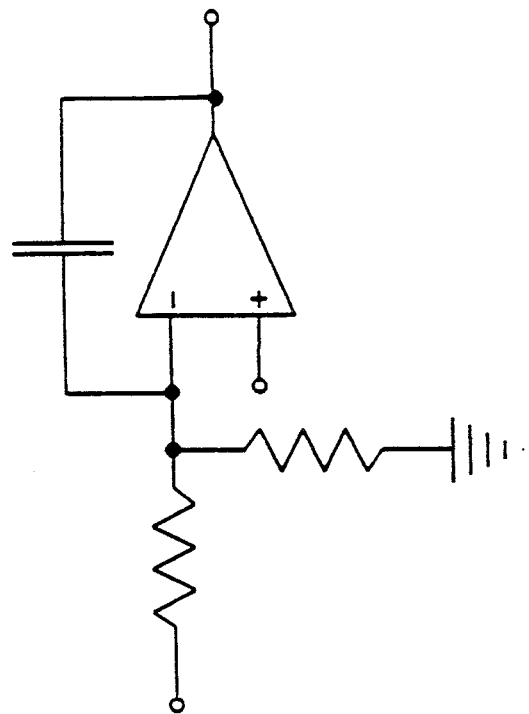
FIG. 5B is a diagram illustrating a differentiating controller which may substituted for the PID controller shown in FIG. 1.
Figure 5A:
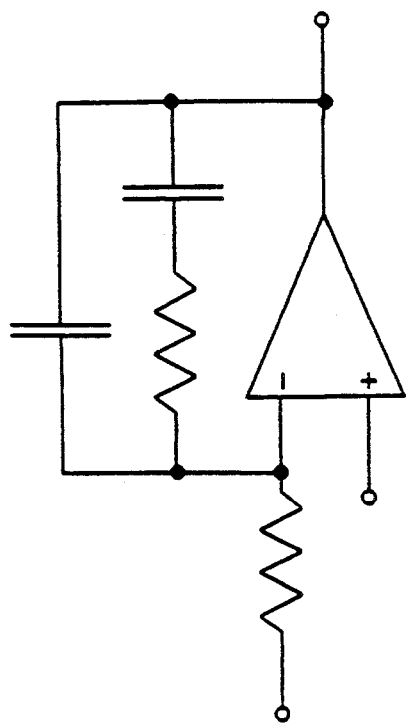
FIG. 5A is a diagram illustrating a proportional integral controller which may substituted for the PID controller shown in FIG. 1.

Additional embodiments of the above described invention could be arrived at by substituting a controller having alternative topography for the PID controller. A PID controller is nothing more than a controller employing an amplifier which has two zero-pole pairs in addition to the basic pole at the origin. Dependent upon the specific application, other types of (see FIG. 5A) or differentiating (see FIG. 5B) controllers, could be substituted for the PID controller in the above described embodiment.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A sine wave synthesis controller comprising:
   a first amplifier having a positive input terminal, a negative input terminal, and an output terminal, said negative input terminal being coupled to receive an output waveform from a digitally-controlled inverter, said positive input terminal being coupled to a grounded reference point, and said first amplifier being configured so as to invert any signal received from the inverter;

a second amplifier having a positive input terminal, a negative input terminal, and an output terminal, said negative input terminal coupled to receive a reference sine wave signal and the output of the first amplifier, said positive input terminal being coupled to said grounded reference point, and said second amplifier being configured so as to output a signal equal to the algebraic sum of the signals received at its input terminal;

a third amplifier having a positive input terminal, a negative input terminal, and an output terminal, said negative input terminal being coupled to receive the signal output by the second amplifier, said positive input terminal being coupled to said grounded reference point, and said third amplifier being configured so as to first differentiate, and then integrate the signal received at its negative input terminal;

a fourth amplifier having a positive input terminal, a negative input terminal, and an output terminal, said negative input terminal coupled to receive the integrated signal output by the third amplifier, said positive input terminal being coupled to receive a first reference voltage, and said fourth amplifier being configured so as to maintain either a first or second output signal level, dependant upon the level of the received signal output by the third amplifier with respect to the level of the reference voltage applied to the positive input terminal of the fourth amplifier;

a fifth amplifier having a positive input terminal, a negative input terminal, and an output terminal, said positive input terminal coupled to receive the signal output by the third amplifier, said negative input terminal being coupled to receive a second reference voltage, and said fifth amplifier being configured so as to maintain either a first or second output signal level, dependant upon the level of the received signal output by the third amplifier with respect to the level of the reference voltage applied to the negative input terminal of the fifth amplifier.

2. A sine wave synthesis controller comprising:

a first amplifier having a positive input terminal, a negative input terminal, and an output terminal, said negative input terminal being coupled to receive an output waveform from a digitally-controlled inverter, said positive input terminal being coupled to a grounded reference point, and said first amplifier being configured so as to invert any signal received from the inverter;

a second amplifier having a positive input terminal, a negative input terminal, and an output terminal, said negative input terminal coupled to receive a reference sine wave signal and the output of the first amplifier, said positive input terminal being coupled to said grounded reference point, and said second amplifier being configured so as to output a signal equal to the algebraic sum of the signals received at its input terminal;

a third amplifier having a positive input terminal, a negative input terminal, and an output terminal, said negative input terminal being coupled to receive the signal output by the second amplifier, said positive input terminal being coupled to said grounded reference point, and said third amplifier being configured so as to integrate the signal received at its negative input terminal;

a fourth amplifier having a positive input terminal, a negative input terminal, and an output terminal, said negative input terminal coupled to receive the integrated signal output by the third amplifier, said positive input terminal being coupled to receive a first reference voltage, and said fourth amplifier being configured so as to maintain either a first or second output signal level, dependant upon the level of the received signal output by the third amplifier with respect to the level of the reference voltage applied to the positive input terminal of the fourth amplifier;

a fifth amplifier having a positive input terminal, a negative input terminal, and an output terminal, said positive input terminal coupled to receive the signal output by the third amplifier, said negative input terminal being coupled to receive a second reference voltage, and said fifth amplifier being configured so as to maintain either a first or second output signal level, dependant upon the level of the received signal output by the third amplifier with respect to the level of the reference voltage applied to the negative input terminal of the fifth amplifier.

3. A sine wave synthesis controller comprising:

a first amplifier having a positive input terminal, a negative input terminal, and an output terminal, said negative input terminal being coupled to receive an output waveform from a digitally-controlled inverter, said positive input terminal being coupled to a grounded reference point, and said first amplifier being configured so as to invert any signal received from the inverter;

a second amplifier having a positive input terminal, a negative input terminal, and an output terminal, said negative input terminal coupled to receive a reference sine wave signal and the output of the first amplifier, said positive input terminal being coupled to said grounded reference point, and said second amplifier being configured so as to output a signal equal to the algebraic sum of the signals received at its input terminal;

a third amplifier having a positive input terminal, a negative input terminal, and an output terminal, said negative input terminal being coupled to receive the signal output by the second amplifier, said positive input terminal being coupled to said grounded reference point, and said third amplifier being configured so as to differentiate the signal received at its negative input terminal;

a fourth amplifier having a positive input terminal, a negative input terminal, and an output terminal, said negative input terminal coupled to receive the integrated signal output by the third amplifier, said positive input terminal being coupled to receive a first reference voltage, and said fourth amplifier being configured so as to maintain either a first or second output signal level, dependant upon the level of the received signal output by the third amplifier with respect to the level of the reference voltage applied to the positive input terminal of the fourth amplifier;

a fifth amplifier having a positive input terminal, a negative input terminal, and an output terminal, said positive input terminal coupled to receive the signal output by the third amplifier, said negative input terminal being coupled to receive a second reference voltage, and said fifth amplifier being configured so as to maintain either a first or second output signal level, dependant upon the level of the received signal output by the third amplifier with respect to the level of the reference voltage applied to the negative input terminal of the fifth amplifier.

4. The sine wave synthesis controller of claims 1, 2 or 3 wherein the level of the reference voltage applied to the positive input terminal of said fourth amplifier, and the level of the reference voltage applied to the negative input terminal of said fifth amplifier are a function of the voltage level of the output waveform from the digitally-controlled inverter coupled to said first amplifier.

5. The sine wave synthesis controller of claims 1, 2 or 3 wherein the level of the reference voltage applied to the positive input terminal of said fourth amplifier, and the level of the reference voltage applied to the negative input terminal of said fifth amplifier are a function of the current level of output waveform from the digitally-controlled inverter coupled to said first amplifier.

* * * * *